Patented Aug. 28, 1928.

1,682,397

UNITED STATES PATENT OFFICE.

STUART P. MILLER, OF PHILADELPHIA, PENNSYLVANIA, ASSIGNOR TO THE BARRETT COMPANY, A CORPORATION OF NEW JERSEY.

RUBBER AND RESIN COMPOUND.

No Drawing.   Application filed November 25, 1924.  Serial No. 752,190.

This invention relates to a new and useful composition of matter and to the process of making the same. It relates more particularly to dissolving rubber in a certain kind of resin to produce a product that is suitable for many different uses.

In carrying out this invention I preferably use so-called paracoumaron resin or cumar which is obtained, for example, by polymerizing the polymerizable constituents in solvent naptha.

I have found that either raw or unvulcanized rubber or vulcanized rubber is soluble to some extent in paracoumaron resin, or at least that it forms therewith a homogeneous mixture which, for convenience of description, will be called a solution, by merely melting the resin and stirring the rubber therein. It is possible to dissolve in this manner 10% or more by weight of rubber in the resin which seems to stay in solution even when the resin becomes cold. It has been found to be more difficult to dissolve the vulcanized rubber than it is the unvulcanized rubber stock in this manner.

The resin changes in appearance with the amount of rubber incorporated therein and the melting point of the solution is lower than that of the resin in which the rubber is dissolved and the solutions containing the larger quantities of rubber appear to be of a waxy nature. For instance when upwards of approximately 8% of crude unvulcanized rubber is dissolved in the molten resin, the resulting mixture will be characterized by its waxy appearance and consistency when cold. The amount of rubber added to the resin will also vary the melting point of the resultant solution within certain limits.

As a specific illustration of the invention I give the following example without intending to limit the invention to the particular proportions stated or to the particular grade or melting point of cumar mentioned:—

When about 8% by weight of crude, unvulcanized rubber is dissolved in cumar, of a melting point between 125° C. and 128° C., by melting the cumar and stirring pieces of rubber therein, the melting point of the mixture becomes about 123° C.

The product obtained by dissolving rubber in paracoumaron resin may be used for a variety of different purposes such as for example, in varnishes, paints, lacquers, enamels and coatings of similar sort; as insulating compounds as the paracoumaron has high dielectric strength; as a waterproofing compound or for impregnating fibrous materials or fabrics, the paracoumaron being alkali and acid resistant. The solutions of rubber and paracoumaron resin may also be used in the manufacture of linoleum.

I claim:

1. As a new article of manufacture, a waxy solution of about 10% of rubber dissolved in paracoumaron resin having a melting point of approximately 126° C.

2. An article of manufacture having a melting point of approximately 123° C. comprising a waxy mixture of paracoumaron resin and approximately 8% by weight of rubber.

In testimony whereof I affix my signature.

STUART P. MILLER.